United States Patent
Srinivasan et al.

(10) Patent No.: US 10,353,769 B2
(45) Date of Patent: Jul. 16, 2019

(54) RECOVERING FROM ADDRESSING FAULT IN A NON-VOLATILE MEMORY

(71) Applicant: Apple Inc., Cupertino, CA (US)

(72) Inventors: Charan Srinivasan, San Jose, CA (US); Eyal Gurgi, Petach Tikva (IL)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 15/658,433

(22) Filed: Jul. 25, 2017

(65) Prior Publication Data

US 2019/0034273 A1    Jan. 31, 2019

(51) Int. Cl.
| G06F 11/00 | (2006.01) |
|---|---|
| G06F 11/10 | (2006.01) |
| G06F 11/14 | (2006.01) |
| G06F 11/08 | (2006.01) |

(52) U.S. Cl.
CPC .......... *G06F 11/1016* (2013.01); *G06F 11/08* (2013.01); *G06F 11/1076* (2013.01); *G06F 11/1441* (2013.01); *G06F 2201/805* (2013.01); *G06F 2201/82* (2013.01)

(58) Field of Classification Search
CPC .. G06F 11/08; G06F 11/1016; G06F 11/1076; G06F 13/1689; G11C 11/4076; G11C 8/18; G11C 7/22; G11C 7/222
See application file for complete search history.

(56) References Cited

U.S. PATENT DOCUMENTS

| 6,813,184 B2 | 11/2004 | Lee |
| 7,227,782 B2 | 6/2007 | Lee et al. |
| 7,447,066 B2 | 11/2008 | Conley et al. |
| 8,120,957 B2 | 2/2012 | Tokiwa |
| 9,348,694 B1 | 5/2016 | Nassie |
| 2006/0236205 A1* | 10/2006 | Kuramoto ........... G06F 11/1016 714/763 |
| 2008/0082869 A1* | 4/2008 | Sugawara ........... G06F 11/1016 714/702 |
| 2013/0080854 A1* | 3/2013 | Nicholas ............ G06F 11/1016 714/758 |
| 2016/0124664 A1 | 5/2016 | Sabde et al. |

* cited by examiner

*Primary Examiner* — Michael Maskulinski
(74) *Attorney, Agent, or Firm* — Kligler & Associates

(57) ABSTRACT

A storage system includes an interface and storage circuitry. The interface is configured to communicate with a plurality of memory cells coupled to multiple Bit Lines (BLs). The memory cells are programmed and read in sub-groups of multiple BLs, and the sub-groups correspond to respective addresses. The storage circuitry is configured to generate a sequence of addresses for reading memory cells that together store a data part and a pattern part containing a predefined pattern, via multiple respective sub-groups, to detect that the data part read from the memory cells is erroneous due to a fault that occurred in the sequence of addresses by identifying a mismatch between the pattern part read from the memory cells and the predefined pattern, and, in response to detecting the fault, to take a corrective measure to recover an error-free version of the data part.

16 Claims, 3 Drawing Sheets

Shifted Down

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | C4 | A3 | 12 | 31 |
| 1058 | 45 | 71 | F2 | B1 | 88 | 26 | 18 | 44 |
| 1060 | D1 | 32 | 59 | 36 | 41 | 83 | A2 | 18 |
| 1068 | 00 | 11 | 00 | 11 | 00 | 11 | 00 | 11 |

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | FF | FF | 12 | 31 |
| 1058 | 45 | 71 | F2 | B1 | C4 | A3 | 18 | 44 |
| 1060 | D1 | 32 | 59 | 36 | 88 | 26 | A2 | 18 |
| 1068 | 00 | 11 | 00 | 11 | 41 | 83 | 00 | 11 |

Shifted Up

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | C4 | A3 | 12 | 31 |
| 1058 | 45 | 71 | F2 | B1 | 88 | 26 | 18 | 44 |
| 1060 | D1 | 32 | 59 | 36 | 41 | 83 | A2 | 18 |
| 1068 | 00 | 11 | 00 | 11 | 00 | 11 | 00 | 11 |

| Col | 0 | 1 | 2 | 3 | 4 | 5 | 6 | 7 |
|---|---|---|---|---|---|---|---|---|
| 1048 | 24 | 45 | 10 | 32 | C4 | A3 | B4 | E2 |
| 1050 | B2 | 34 | 90 | D2 | 88 | 26 | 12 | 31 |
| 1058 | 45 | 71 | F2 | B1 | 41 | 83 | 18 | 44 |
| 1060 | D1 | 32 | 59 | 36 | 00 | 11 | A2 | 18 |
| 1068 | 00 | 11 | 00 | 11 | FF | FF | 00 | 11 |

FIG. 2

Shifted Down

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | FF | FF | 12 | 31 |
| 1058 | 45 | 71 | F2 | B1 | C4 | A3 | 18 | 44 |
| 1060 | D1 | 32 | 59 | 36 | 88 | 26 | A2 | 18 |
| 1068 | 00 | 11 | 00 | 11 | 41 | 83 | 00 | 11 |

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | FF | FF | 12 | 31 |
| 1058 | 45 | 71 | F2 | B1 | C4 | A3 | 18 | 44 |
| 1060 | D1 | 32 | 59 | 36 | 88 | 26 | A2 | 18 |
| 1068 | 00 | 11 | 00 | 11 | 41 | 83 | 00 | 11 |

Shifted Up

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | FF | FF | 12 | 31 |
| 1058 | 45 | 71 | F2 | B1 | C4 | A3 | 18 | 44 |
| 1060 | D1 | 32 | 59 | 36 | 88 | 26 | A2 | 18 |
| 1068 | 00 | 11 | 00 | 11 | 41 | 83 | 00 | 11 |

| Col | 0 | 1 | 2 | 3 | 4 | 5 | 6 | 7 |
|---|---|---|---|---|---|---|---|---|
| 1048 | 24 | 45 | 10 | 32 | D3 | A3 | B4 | E2 |
| 1050 | B2 | 34 | 90 | D2 | C4 | A3 | 12 | 31 |
| 1058 | 45 | 71 | F2 | B1 | 88 | 26 | 18 | 44 |
| 1060 | D1 | 32 | 59 | 36 | 41 | 83 | A2 | 18 |
| 1068 | 00 | 11 | 00 | 11 | 00 | 11 | 00 | 11 |

FIG. 2

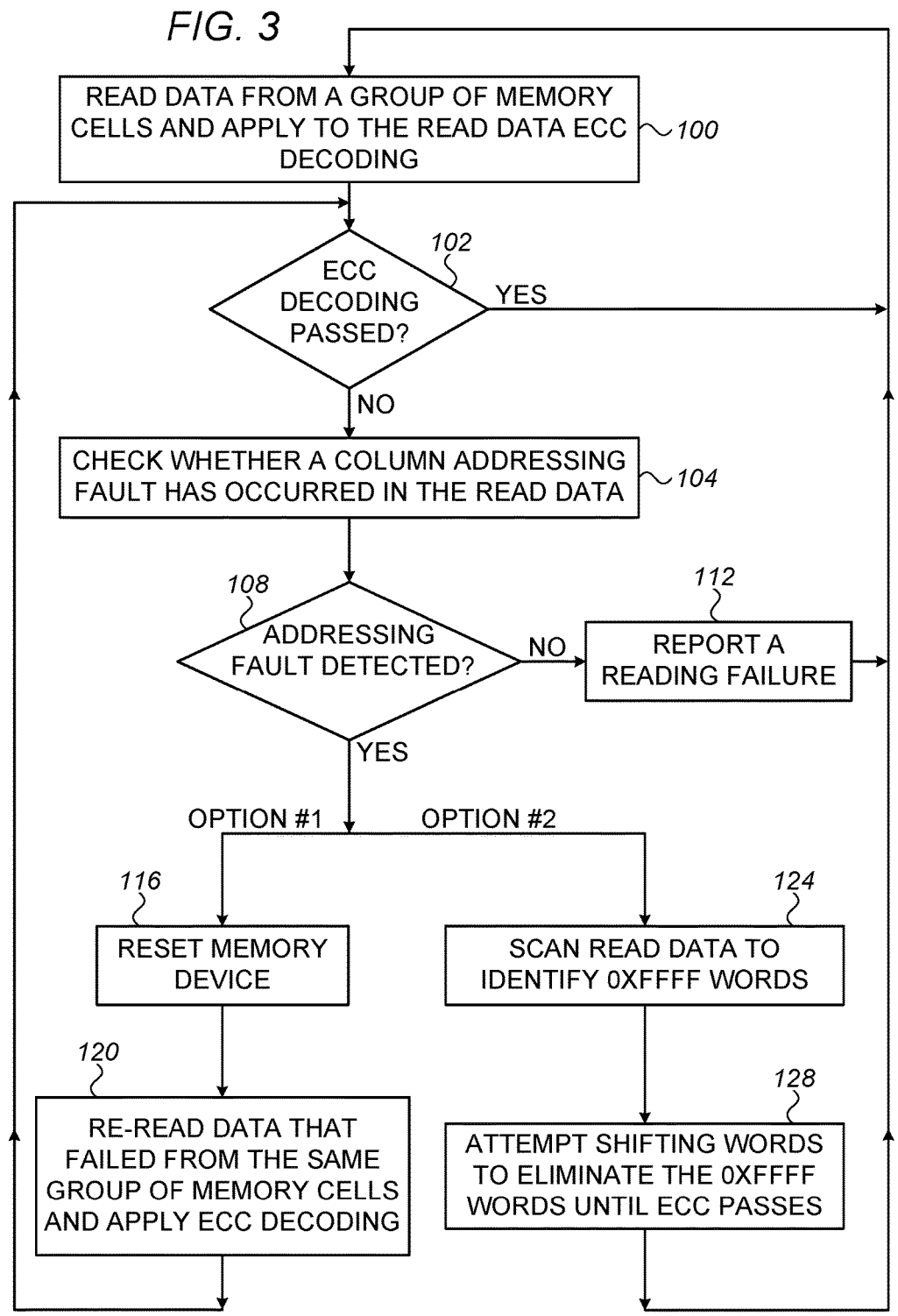

RECOVERING FROM ADDRESSING FAULT IN A NON-VOLATILE MEMORY

TECHNICAL FIELD

Embodiments described herein relate generally to data storage, and particularly to methods and systems for recovering from faults occurring in addressing a memory array in a non-volatile memory device.

BACKGROUND

A non-volatile memory device typically comprises multiple memory cells interconnected via Word Lines (WLs) and Bit lines (BLs) forming a memory array. Methods for handling defective BLs are known in the art. For example, U.S. Pat. No. 7,447,066 describes a scheme in a memory array having redundant columns, which allows defective cells to be individually remapped to redundant cells in a redundant column. Redundant cells in one redundant column replace defective cells in multiple non-redundant columns. Remapping is done as part of initial test and configuration. Specific hardware can be used for the scheme, or firmware in the memory controller can implement the scheme.

U.S. Pat. No. 6,813,184 describes a NAND flash memory that includes a data loading circuit providing a program data bit into a page buffer having first and second latches. During a data loading operation for programming, the data loading circuit puts a pass data bit into a page buffer corresponding to a defective column, instead of a program data bit that is assigned to the defective column, responding to information of a column address involved in the defective column. It is available to provide a pass/fail check circuit for program-verifying without employing a fuse arrangement, making data of the defective column not affect a program-verifying result.

SUMMARY

An embodiment that is described herein provides a storage system, including an interface and storage circuitry. The interface is configured to communicate with a plurality of memory cells coupled to multiple Bit Lines (BLs). The memory cells are programmed and read in sub-groups of multiple BLs, and the sub-groups correspond to respective addresses. The storage circuitry is configured to generate a sequence of addresses for reading memory cells that together store a data part and a pattern part containing a predefined pattern, via multiple respective sub-groups, to detect that the data part read from the memory cells is erroneous due to a fault that occurred in the sequence of addresses by identifying a mismatch between the pattern part read from the memory cells and the predefined pattern, and, in response to detecting the fault, to take a corrective measure to recover an error-free version of the data part.

In some embodiments, the storage circuitry is configured to generate the sequence of addresses by generating multiple addresses in parallel for accessing the memory cells via multiple respective sub-groups of BLs. In other embodiments, the fault causes skipping of at least one of the addresses in the sequences of addresses, and the storage circuitry is configured to detect the fault by detecting the skipping. In yet other embodiments, the storage circuitry is configured to recover the error-free version of the data part, by resetting in the storage circuitry a hardware element that is involved in generating the sequence of addresses.

In an embodiment, at least the data part is protected using an Error Correction Code (ECC), the fault causes reading the data part with false ordering, and the storage circuitry is configured to recover the error-free version of the data part by reordering the data part for producing a reordered data part, and applying ECC decoding to the reordered data part. In another embodiment, the read data part includes multiple data items that were accessed via multiple respective sub-groups of BLs, and the storage circuitry is configured to produce the reordered data part by identifying in the read data part a given data item that is suspected to be damaged by the fault, and replacing the given data item with another data item of the read data part.

In some embodiments, the storage circuitry is configured to detect the fault only after applying ECC decoding to the at least data part and identifying that the ECC decoding fails. In other embodiments, the storage circuitry is configured to generate the sequence of addresses for reading the memory cells in response to programming the data part and the pattern part to the memory cells.

There is additionally provided, in accordance with an embodiment that is described herein a method, including, in storage system that includes a plurality of memory cells that are coupled to multiple Bit Lines (BLs) and that are programmed and read via sub-groups of multiple BLs, and the sub-groups correspond to respective addresses, generating a sequence of addresses for reading the memory cells via multiple respective sub-groups. The memory cells together store a data part and a pattern part that contains a predefined pattern. An event indicating that the data part read from the memory cells is erroneous due to a fault that occurred in the sequence of addresses is detected, by identifying a mismatch between the pattern part read from the memory cells and the predefined pattern. In response to detecting the fault, corrective measure is taken for recovering an error-free version of the data part.

These and other embodiments will be more fully understood from the following detailed description of the embodiments thereof, taken together with the drawings in which:

BRIEF DESCRIPTION OF THE DRAWINGS

FIG. 2 is a diagram that schematically illustrates addressing faults that result in reading failures, in accordance with an embodiment that is described herein; and FIG. 3 is a flow chart that schematically illustrates a method for recovering from faults occurring in generating column addresses for accessing a memory array, in accordance with an embodiment that is described herein.

DETAILED DESCRIPTION OF EMBODIMENTS

Overview

Figure 1:
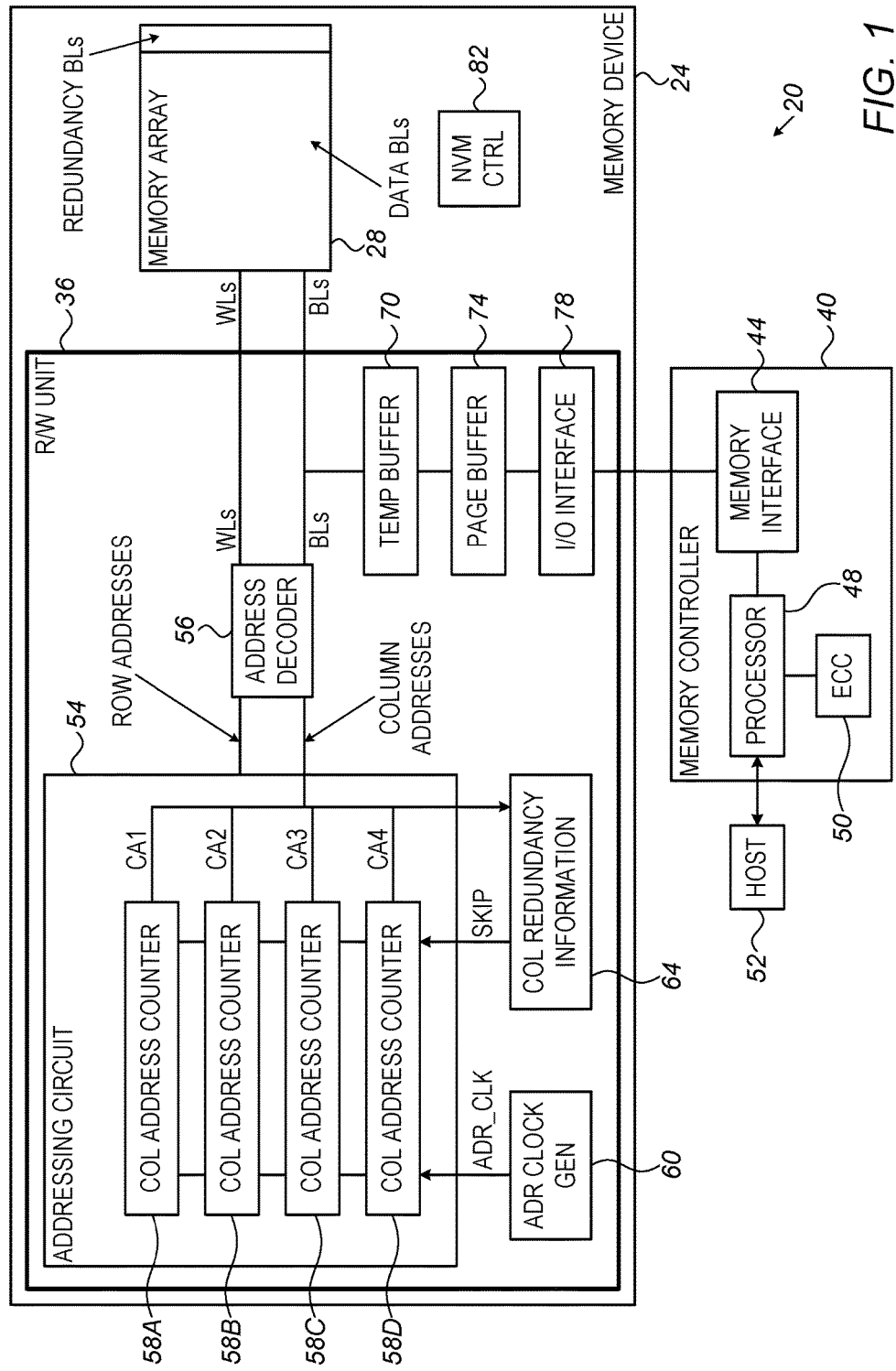
FIG. 1 is a block diagram that schematically illustrates a memory system, in accordance with an embodiment that is described herein.

A non-volatile memory device typically comprises multiple memory cells interconnected in a grid of Word Lines (WLs) and Bit Lines (BLs). Accessing the memory cells typically involves generating row and column addresses that are decoded into respective WLs and BLs. Typically, in reading and programming the memory array, multiple memory cells in a single WL are accessed simultaneously via their respective BLs.

Embodiments that are described herein provide methods and systems for recovering from faults occurring in addressing BLs for accessing the memory cells.

A memory array typically comprises tens of thousands of BLs (or more), some of which may be defective because of imperfect manufacturing process. The memory array is typically manufactured with a plurality of redundant BLs that can be used in place of the defective BLs, at run time. The vendor provides a mapping that classifies the BLs as functional or defective. This mapping, as well as other elements in the memory device that are used for addressing the BLs at run time, are vulnerable to certain malfunction modes that may cause reading failure events, as will be described in detail below.

The disclosed techniques are not tied to the specific methods and hardware configurations for managing defective BLs, which are given herein only by way of example. Moreover, the disclosed techniques are also applicable to cases in which all of the BLs are manufactured as functional BLs.

In the present example, accessing the memory cells is carried out in units of multiple BLs that are referred to herein as BL sub-groups. The BL sub-groups are associated with respective addresses. In the present example, each of the BL sub-groups contains sixteen BLs, for accessing a two-byte unit, also denoted "2B."

In some embodiments, a plurality of memory cells of the memory device stores together a data part and a pattern part that contains a predefined pattern. The pattern part is used for detecting addressing faults. In response to receiving a read command, e.g., from an external memory controller, the memory device generates a sequence of addresses for reading the plurality of the memory cells via multiple respective BL sub-groups. The memory controller detects that the data part read from the memory cells is erroneous due to a fault that occurred in the sequence of addresses, by detecting a mismatch between the pattern part read from the memory cells and the predefined pattern. In response to detecting the fault, the memory controller takes a corrective measure to recover an error-free version of the data part.

In some embodiments, the memory device generates the sequence of addresses by generating multiple addresses corresponding to multiple respective BL sub-groups for accessing multiple data items in parallel. The multiple addresses may be generated using multiple respective address counters. In such embodiments, an addressing fault may occur, for example, in one or more of the address counters.

The BL sub-groups correspond to accessing data units that are referred to as "data items." For example, for BL sub-groups of 16 BLs, the data items contain 16 bits. An addressing fault may result in skipping an address in the sequence of addresses, which results in an incorrect ordering of the data items in the read data part. For example, a group of data items corresponding to a respective address counter may be shifted within the data part because of the address skipping.

In some embodiments, to recover the correct data part, the memory controller resets a hardware element that is involved in generating the sequence of addresses, and then attempts re-reading the same memory cells in which the reading operation has failed. In other embodiments the memory controller reorders the data items in the read data part for producing a reordered data part, and applies to the reordered data part ECC decoding to recover the correct data part.

In an embodiment, the memory controller identifies, in the read data part, a given data item that is suspected to be damaged by the addressing fault, e.g., due to an untimed latching operation, and replaces the given data item with another data item of the read data part. In some embodiments, the memory controller shifts together one or more data items that are associated with one of the address counters in eliminating the given data item.

The methods described above can be used during a programming operation, e.g., as part of a read-verify scheme.

By using the disclosed techniques, data retrieved erroneous from the memory due to addressing faults can be recovered even when ECC decoding fails, which would not possible without the disclosed techniques.

System Description

FIG. 1 is a block diagram that schematically illustrates a memory system 20, in accordance with an embodiment that is described herein. Memory system 20 can be used in various host systems and devices, such as in computing devices, cellular phones or other communication terminals, removable memory modules, Solid State Disks (SSD), Secure Digital (SD) cards, Multi-Media Cards (MMC) and embedded MMC (eMMC), digital cameras, music and other media players and/or any other system or device in which data is stored and retrieved.

Memory system 20 comprises a memory device 24, which stores data in a memory array 28. The memory array comprises multiple memory cells (not shown), such as analog memory cells. In the context of the present patent application, the term "analog memory cell" is used to describe any memory cell that holds a continuous, analog value of a physical parameter, such as an electrical voltage or charge. Memory array 28 may comprise solid-state memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM), Resistive RAM (RRAM) and/or Dynamic RAM (DRAM) cells. Although the embodiments described herein refer mainly to analog memory, the disclosed techniques may also be used with various other memory types.

The charge levels stored in the memory cells and/or the analog voltages or currents written into and read out of the memory cells are referred to herein collectively as analog values, storage values or analog storage values. Although the embodiments described herein mainly address threshold voltages, the methods and systems described herein may be used with any other suitable kind of storage values.

Memory system 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell Multi-Level Cell (MLC) can be programmed to assume one of four possible programming levels by writing one of four possible nominal storage values into the memory cell.

Memory device 24 comprises a reading/writing (R/W) unit 36, which converts data for storage in the memory device to analog storage values and writes them into the memory cells. In alternative embodiments, the R/W unit does not perform the conversion, but is provided with voltage samples, i.e., with the storage values for storage in the memory cells. When reading data out of memory array 28, R/W unit 36 converts the storage values of the memory cells being read into digital samples having an integer resolution of one or more bits. Data is typically written to and read from the memory cells in data units that are referred to as data pages (or simply pages, for brevity).

The storage and retrieval of data in and out of memory device 24 is performed by a memory controller 40.

Memory controller 40 comprises a memory interface 44 for communicating with memory device 24 over any suitable link or bus such as, for example, a PCIe bus. The memory controller additionally comprises a processor 48, and an Error Correction Code (ECC) unit 50. The disclosed techniques can be carried out by memory controller 40, by R/W unit 36, or both. Thus, in the present context, memory controller 40 and R/W unit 36 are referred to collectively as storage circuitry that carries out the disclosed techniques.

Memory controller 40 communicates with a host 52, for accepting data for storage in the memory device and for outputting data retrieved from the memory device. ECC unit 50 encodes the data for storage using a suitable ECC and decodes the ECC of data retrieved from the memory. ECC unit 50 may comprise any suitable type of ECC, such as, for example, Low Density Parity Check (LDPC), Reed-Solomon (RS) or Bose-Chaudhuri-Hocquenghem (BCH), can be used. In some embodiments, the ECC is applied selectively, i.e., to only some of the data stored.

The encoded data generated by the ECC encoder is referred to as a code word. Due to various memory impairments, when read from the memory, the code word may contain one or more errors. In some embodiments, when the code word read from the memory contains a number of errors larger than the maximal number of errors that ECC unit 50 is designed to correct, the memory controller reports an "Unrecoverable ECC" (UECC) event.

Memory controller 40 may be implemented in hardware, e.g., using one or more Application-Specific Integrated Circuits (ASICs) or Field-Programmable Gate Arrays (FPGAs). Alternatively, the memory controller may comprise a microprocessor that runs suitable software, or a combination of hardware and software elements.

The configuration of FIG. 1 is an example memory system configuration, which is shown purely for the sake of conceptual clarity. Any other suitable memory system configuration can also be used. For example, although the example of FIG. 1 shows a single memory device, in alternative embodiments memory controller 40 may control multiple memory devices 24, e.g., in a RAID storage system. Elements that are not necessary for understanding the principles of the present disclosure, such as various interfaces, addressing circuits, timing and sequencing circuits and debugging circuits, have been omitted from the figure for clarity.

In the example memory system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 40 can be implemented in software and carried out by a processor (e.g., processor 48) or other element of the host system. In some embodiments, host 52 and memory controller 40 may be fabricated on the same die, or on separate dies in the same device package.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In an example configuration, the memory cells of memory array 28 are arranged in multiple rows and columns, and each memory cell comprises a floating-gate transistor. The gates of the transistors in each row are connected by Word Lines (WLs), and the sources of the transistors in each column are connected by Bit Lines (BLs). In the description that follows the terms WL and "word line" as well as the terms BL and "bit line" are used interchangeably.

In the present context, the term "row" is used in the conventional sense to mean a group of memory cells that are fed by a common word line, and the term "column" means a group of memory cells fed by a common bit line. The terms "row" and "column" do not connote a certain physical orientation of the memory cells relative to the memory device. The memory array is typically divided into multiple memory pages, i.e., groups of memory cells that are programmed and read simultaneously, as seen by the memory controller. As such, the memory controller typically sends to the memory device a command to program or read an entire data page to or from a given group of memory cells. Within the memory device, however, accessing the memory cells in the given group is carried out by sequentially addressing multiple BL sub-groups whose BLs are coupled to the memory cells in the given group.

In some embodiments, memory pages are sub-divided into sectors. Data pages may be mapped to word lines in various manners. Each word line may store one or more data pages. A given data page may be stored in all the memory cells of a word line, or in a subset of the memory cells (e.g., the odd-order or even-order memory cells).

Erasing of memory cells is usually carried out in blocks that contain multiple memory pages. Typical memory devices may comprise thousands of erasure blocks (also referred to as "memory blocks"). In a typical two-bit-per-cell MLC device, each erasure block is on the order of 128 word lines, each comprising several tens of thousands of memory cells. Each word line of such a device is often partitioned into four data pages (odd/even order memory cells, least/most significant bit of the memory cells). Two-bit-per-cell devices having 128 word lines per erasure block that store a data page per bit significance value would have 256 data pages per erasure block, and three-bit-per-cell devices would have 384 data pages per block. Alternatively, other block sizes and configurations can also be used. R/W unit 36 comprises an addressing circuit 54 that generates row addresses and column addresses, and an address decoder 56, which decodes the row addresses into WLs and the column addresses into BLs of the memory array. In the example of FIG. 1, addressing circuit 54 comprises four column address counters 58A . . . 58D that generate respective column addresses CA1 . . . CA2 for accessing four respective BL sub-groups in parallel. Table 1 below depicts an example translation of the column addresses CA1 . . . CA4 into BL sub-groups with reference to a BL whose index is denoted "n."

TABLE 1

A translation between column addresses and respective BLs

| CA1 | CA2 | CA3 | CA4 |
|---|---|---|---|
| . . . | . . . | . . . | . . . |
| BLn . . . | BLn + 16 . . . | BLn + 32 . . . | BLn + 48 . . . |
| BLn + 15 | BLn + 31 | BLn + 47 | BLn + 63 |
| BLn + 64 . . . | BLn + 80 . . . | BLn + 96 . . . | BLn + 112 . . . |
| BLn + 79 | BLn + 95 | BLn + 111 | BLn + 127 |
| . . . | . . . | . . . | . . . |

Each row in Table 1 corresponds to four consecutive column addresses and depicts the BLs contained in the respective BL sub-groups. A column address CAi differs by 64 BLs (equivalent to four consecutive BL sub-groups) between neighbor rows of the table. A single memory page is therefore accessed by generating (e.g., in parallel) four sequences of column addresses that are staggered by a BL sub-group interval, and each of the four sequences of column addresses advances in units of four BL sub-groups.

R/W unit comprises an address clock generator 60 that generates a clock signal denoted ADR_CLCK for triggering the column address counters 58. In some embodiments, the signal ADR_CLK drives the column address counters in parallel. In response to a clock pulse of the ADR_CLK signal, each of the column address counters advances to the next BL sub-group in the sequence of column addresses of the respective CAi, i=1 . . . 4, as depicted in Table 1 above. This configuration supports accessing 64 BLs in parallel, within a single clock cycle of the ADR_CLK signal.

R/W unit 36 further comprises a column redundancy information module 64 that identifies faulty BL sub-groups, wherein a faulty BL sub-group refers to herein as a BL sub-group that contains one or more defective BLs. Column redundancy information module 64 is typically initialized or provided by the vendor of the memory device after performing suitable post-production tests.

In some embodiments, the column redundancy information is stored in a Read Only Memory (ROM) block or in a One-Time Programmable (OTP) block (not shown), as NAND bits. Alternatively, the column redundancy information is stored in fuses of the memory device (not shown).

R/W unit 36 compares each of the column addresses CA1 . . . CA4 against the information held in column redundancy information module 64. When a column address CAi matches an entry in the column redundancy information module, the respective BL sub-group is skipped, and the sequence of column addresses continues from the next BL sub-group whose BLs are all functional. In an embodiment, to skip a BL sub-group, each of the column address counters, starting with the CAi that matched the column redundancy information, advances to the next CA or column. In alternative embodiments, other suitable implementations for skipping BL-subgroups at a suitable desired granularity can also be used.

Column redundancy information module 64 can be implemented using any suitable configuration. In some embodiments, column redundancy information module 64 is implemented using a Read Only Memory (ROM). Alternatively, column redundancy information module 64 is implemented using multiple fuses that are burned in the factory to classify the BLs as functional or non-functional, e.g., in a BL sub-group granularity.

R/W unit 36 further comprises a temporary buffer 70, a page buffer 74 and an Input-Output (IO) interface 78. In some embodiments, the size of temporary buffer 70 equals the data size that can be retrieved from the memory array in a single accessing operation. Alternatively, other suitable sizes of the temporary buffer can also be used.

In some embodiments, the R/W unit accepts a data page to be programmed in the memory array, from the memory controller via IO interface 78. The R/W unit stores the accepted data page in page buffer 74. To program the data page in memory array 28, the R/W unit copies four BL sub-groups of the data page to the temporary buffer. The four BL sub-groups are then programmed in parallel to a group of 64 memory cells via the 64 BLs of the four respective BL sub-groups based on the current column addresses of column address counters 58. Subsequently, the R/W unit advances column address counters 58 as explained above.

In the read direction, the R/W unit reads a group of 64 memory cells via their four respective BL sub-groups into the temporary buffer, by generating the relevant column addresses CA1 . . . CA4 using column address counters 58, and copies the resulting 64 bits from the temporary buffer to the page buffer. The R/W unit thus reads the data page into temporary buffer 70 in groups of 64 bits, one group of 64 bits at a time.

The R/W unit copies each 64-bit group from the temporary buffer to the relevant position within the page buffer so as to recover the full data page in the correct order. For example, when the R/W unit reads the data page in order of 64-bit groups, the R/W unit appends each 64-bit group that is copied from the temporary buffer to the previous 64-bit group copied to the page buffer. When the entire data page has been read into the page buffer, the R/W unit sends the content of the page buffer to the memory controller via IO interface 78. Alternatively, the R/W unit signals to the memory controller, via IO interface 78 or some other interface of the memory device, to read the content of the page buffer.

In some embodiments, R/W unit 36 fails to generate the sequence of column addresses correctly. For example, one of column address counters 58A . . . 58D may fail to respond to the clock signal ADR_CLK. Another mode of failure occurs when a glitch in the ADR_CLK signal is wrongly sensed by one or more of column address counters as a valid clock pulse, and falsely causes the respective column address counters to advance. Yet another type of failure occurs when the column redundancy information module malfunctions. Methods for recovering from column addressing faults such as those described above are described in detail below.

Memory device 24 further comprises a Non-volatile Memory (NVM) controller 82, which implements various management tasks of the memory device.

Example Column Addressing Faults

FIG. 2 is a diagram that schematically illustrates addressing faults that result in reading failures, in accordance with an embodiment that is described herein. Each of the four tables in the figure depicts the last 40 bytes of a data page read from memory array 28 into page buffer 74 via temporary buffer 70. The two tables on the left depict the correct byte values, and the two tables on the right depict incorrect byte values caused by two types of addressing faults, as will be described below. The byte values in the tables are given in Hexadecimal format.

The 40 bytes read into the page buffer are arranged in the tables of FIG. 2 in five rows of eight bytes that are indexed 0 . . . 7. The column addresses (e.g., 1048 in Hexadecimal format) on the left side of each table represent column address to the memory array. In the present example, the column addresses are given in a granularity of a single byte. For example, column address CA1 of column address counter 58A is used for reading from the memory array the first two bytes in the first row of the table. Similarly, CA2=104A, CA3=104D and CA4=104E are used for reading three subsequent 2B data items of the data page depicted in the first row.

The data page stored in the memory array comprises a data part and a pattern part. The pattern part, which is used for detecting column addressing faults, comprises a predefined pattern. In some embodiments, the pattern part is stored in redundancy BLs of the memory array, the redundancy BLs serve as spare BLs not intended for storing data. In the tables of FIG. 2, the three upper rows depict the last 32 bytes of the data part, whereas the bottom row depicts an eight-byte pattern part. In the present example, the predefined pattern contains the eight bytes "00, 11, 00, 11, 00, 11, 00, 11." This predefined pattern is given by way of example, and other suitable patterns of any suitable value and length can also be used.

As noted above, the R/W unit accesses four 2B data items in parallel, by generating four respective column addresses using column address counters 58. For example, in accessing the bytes depicted in the upper row, the R/W unit generates column addresses CA1=1048, CA2=104A, CA3=104C and CA4=104E, in parallel. In this case, CA1, CA2, CA3 and CA4 are used for reading the 2B data items "2445," "1032," "D3A3" and "B4E2," respectively. To read the eight bytes depicted in the second row, each of column addresses CA1 . . . CA4 advances by 8.

Each of column address counters 58A . . . 58D generates a column address to a respective pair of columns of bytes in the tables. As such column address counters 58A, 58B, 58C and 58D are associated with the columns of the bytes indexed (0,1), (2,3), (4,5) and (6,7) in each row of the table.

Consider now two types of faults that may occur in generating the column addresses. In the present example, the addressing faults occur when reading the two bytes "C4A3" corresponding to column address CA3=1054. In the first type of addressing fault, column address counter 58C that generates column address CA3 misses a clock pulse of the ADR_CLK signal, which pulse should have advanced CA3 from column address 104C to 1054. In addition, temporary buffer 70 latches two bytes "FFFF" instead of the correct data "C4A3," due to an untimed latching operation into the temporary buffer. The next clock pulse advances CA3 to column address 1054 to read the "C4A3" data item, but in the page buffer the two bytes of column address 1054 are placed instead of the "8826" data of column address 105C. Similarly, the bytes "8826" and "4183" are placed in the page buffer with a column address shift of 8, and the pattern bytes "0011" are overwritten with the "4183" bytes, as depicted in the upper right table.

In the second type of addressing fault, when column address counter 58C advances to column address 104C for reading the two bytes "D3A3," column address counter 58C advances by two BL sub-groups (16 bytes) instead of one BL sub-group (8 bytes), for example, due to a glitch occurring in address clock generator 60, or a fault occurring in column redundancy information module 64. As a result, the data item corresponding to the third 2B column is placed in the page buffer with a column shift up of 8 bytes. In addition, the data latched in the temporary buffer for column address 106C (and copied to the page buffer) is "FFFF" instead of the "0011" pattern.

In the example, of FIG. 2, the BL sub-groups contain 16 BLs for accessing two bytes of data from the memory array, and the column address counters are implemented in a single byte granularity. The disclosed embodiments, however, are applicable to BL-subgroups of other suitable sizes and to other suitable granularity of the column address counters.

Methods for Recovering from Addressing Faults

FIG. 3 is a flow chart that schematically illustrates a method for recovering from faults occurring in generating column addresses for accessing a memory array, in accordance with an embodiment that is described herein. The method is described as carried out by memory controller 40 of memory system 20 of FIG. 1.

The method begins with memory controller 40 reading data from a group of memory cells of memory array 28 at a reading step 100. In an embodiment, the data read comprises a data page, e.g., a Most Significant Bit (MSB) data page or a Least Significant Bit (LSB) data page, in a 2bit/cell memory array.

In the present example we assume that the data read has been stored protected using a suitable ECC, e.g., using ECC unit 50 of the memory controller. At step 100, the memory controller further decodes the data page read using ECC 50. In alternative embodiments, at step 100, the memory controller reads one or more data pages (or any other suitable data units), e.g., belonging to one or more respective planes of the memory array, and that were encoded together before stored in the memory array.

At a decoding verification step 102, the memory controller checks whether the ECC decoding at step 100 has succeeded, and if so, the memory controller loops back to step 100 to read a subsequent data page. Otherwise, the memory controller proceeds to an addressing fault checking step 104, to check whether a column addressing fault has occurred in the read data, which may be the reason for the ECC decoding failure.

In some embodiments, the data page read from the memory array comprises a data part and a pattern part that was stored along with the data part. In an example embodiment, the pattern part comprises two bytes having values "00, 11" per each column address counter 58, e.g., a total number of eight bytes. Alternatively, the pattern part may comprise any other number of bytes having any suitable pattern values.

In some embodiments, at a fault query step 108, the memory controller compares between the pattern part read from the memory device, and the predefined pattern expected. When the pattern part of the read data matches the predefined pattern, no fault addressing has occurred, with high probability, and the memory controller proceeds to a failure reporting step 112 to report an unrecoverable ECC failure that is unrelated to a column addressing fault.

Otherwise, the memory controller detects a mismatch between the pattern part of the read data and the predefined pattern, which mismatch indicates that a column addressing fault has occurred, with high probability. In response to detecting a column addressing fault at step 108, the memory controller proceeds in one of two options denoted OPTION *1 and OPTION *2 in the figure, for recovering the correct data.

Selecting between OPTION *1 and OPTION *2 is configurable. In an embodiment, only one of OPTION *1 and OPTION *2 is enabled at any given time. In another embodiment, one of OPTION *1 and OPTION *2 is configured as to be executed by default, and when the default option fails to recover the correct data, the memory controller attempts recovering the data using the non-default option. In yet another embodiment, the memory controller attempts to recover the correct data using OPTION *1 for some read operations and using OPTION *2 for other read operations.

In executing OPTION *1, the memory controller resets memory device 24, at a resetting step 116, via I/O interface 78, by sending to the memory device a reset command or by applying to the memory device a hardware reset signal. The underlying assumption in executing OPTION *1 is that resetting the memory device causes a malfunctioning element that has caused the column addressing fault to recover to function properly.

At a re-reading step 120, the memory controller attempts to read the data page whose ECC decoding has failed at step 102 above. At step 120, the memory controller additionally applies ECC decoding to the re-read data, and loops back to step 102 to check whether the ECC decoding has now passed. In some embodiments, the memory controller limits the number of reset and re-read operations involved in executing OPTION *1 to a predefined number. When exceeding this number, the memory controller reports a suitable failure.

Executing OPTION *2 begins at a scanning step 124 at which the memory controller scans the read data page to locate one or more two-byte words having a value "FFFF," which may indicate that an addressing fault has occurred in accessing the respective column address.

At a shifting step 128, the memory controller attempts shifting 2B data items to eliminate the "FFFF" occurrences and placing the 2B data items in their correct places. For example, in the upper right table in FIG. 2, the three data items "C4A3," "8826" and "4183" are shifted up (in this example eight positions toward the beginning of the page buffer) to their correct positions as shown in the upper left table. In this case, the "0011" pattern cannot be recovered.

As another example, in the lower right table in FIG. 2, the three 2B data items "C4A3," "8826," "4183" of the data part (as well as other 2B data items accessed by column address CA3) and the 2B pattern "0011" of the pattern part should be shifted down (in this example eight positions toward the end of the page buffer) to their correct places as shown in the lower left table. The memory controller can perform the shifting operation by shifting the bits up or down by a number of one or more 2B-addresses, or at any suitable granularity (other than 2B) of the column redundancy information.

The underlying assumption in executing OPTION *2 is that when all the 2B data items whose values have been read correctly are shifted back to their correct positions in the page buffer, the ECC decoding will succeed.

Following step 128 the memory controller loops back to step 100 to read a subsequent data page.

In some embodiments, OPTION *1 in the method of FIG. 3 can be applied in reading a data page that is not necessarily protected with an ECC. In such embodiments, the memory controller skips the ECC decoding at step 100 and does not execute step 102 of FIG. 3.

Faults in generating column addresses, as described above, may occur during a programming operation. In such cases, the memory controller sends the data to be programmed to be first stored in the program buffer, and the R/W unit copies the data from the page buffer to the temporary buffer for programming (e.g., in groups of eight bytes) in the memory array according to incorrect column addresses.

In some embodiments, the data to be programmed is retained as reference data in the memory controller and/or in the page buffer. The programming operation is carried out using a read-verify scheme, according to which the memory controller reads back the data recently programed to the memory array, and compares between the read data and the reference data to verify that the programming operation has succeeded.

In some embodiments, as part of the read-verify operation, the memory controller checks whether a fault in generating the column addresses has occurred, e.g., by executing at least step 104 of the method of FIG. 3. When an addressing fault is detected, the memory controller may attempt writing the data in a different memory block. Alternatively, the memory controller may perform OPTION *2 of the method of FIG. 3, to check whether the data is recoverable by shifting data items, and applying ECC decoding as described above.

In some embodiments, the memory controller first reads back from the memory array only the pattern part for executing step 104 of the method of FIG. 3. Then, only in response to detecting a fault in generating the column addresses, the memory controller reads back the entire data page (or data pages) and performs OPTION *2 of the method in FIG. 3.

The embodiments described above are given by way of example, and other suitable embodiments can also be used. The disclosed embodiments are not limited to the BL addressing configuration of FIG. 1, and are applicable mutatis mutandis to any other BL addressing configuration that may malfunction at run time.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A storage system, comprising:
   an interface, configured to communicate with a plurality of memory cells coupled to multiple Bit Lines (BLs), wherein the memory cells are programmed and read in sub-groups of multiple BLs, the sub-groups corresponding to respective addresses; and
   storage circuitry, configured to:
      generate a sequence of addresses for reading the memory cells via multiple respective sub-groups, wherein the memory cells together store a data part and a pattern part that contains a predefined pattern;
      detect that the data part read from the memory cells is erroneous due to a fault that occurred in the sequence of addresses, by identifying a mismatch between the pattern part read from the memory cells and the predefined pattern; and
      in response to detecting the fault, take a corrective measure to recover an error-free version of the data part.

2. The storage system according to claim 1, wherein the storage circuitry is configured to generate the sequence of addresses by generating multiple addresses in parallel for accessing the memory cells via multiple respective sub-groups of BLs.

3. The storage system according to claim 1, wherein the fault causes skipping of at least one of the addresses in the sequences of addresses, and wherein the storage circuitry is configured to detect the fault by detecting the skipping.

4. The storage system according to claim 1, wherein the storage circuitry is configured to recover the error-free version of the data part, by resetting in the storage circuitry a hardware element that is involved in generating the sequence of addresses.

5. The storage system according to claim 1, wherein at least the data part is protected using an Error Correction Code (ECC), wherein the fault causes reading the data part with false ordering, and wherein the storage circuitry is configured to recover the error-free version of the data part by reordering the data part for producing a reordered data part, and applying ECC decoding to the reordered data part.

6. The storage system according to claim 5, wherein the read data part comprises multiple data items that were accessed via multiple respective sub-groups of BLs, and wherein the storage circuitry is configured to produce the reordered data part by identifying in the read data part a given data item that is suspected to be damaged by the fault, and replacing the given data item with another data item of the read data part.

7. The storage system according to claim 5, wherein the storage circuitry is configured to detect the fault only after applying ECC decoding to the at least data part and identifying that the ECC decoding fails.

8. The storage system according to claim 1, wherein the storage circuitry is configured to generate the sequence of addresses for reading the memory cells in response to programming the data part and the pattern part to the memory cells.

9. A method, comprising:
in storage system that comprises a plurality of memory cells coupled to multiple Bit Lines (BLs), wherein the memory cells are programmed and read via sub-groups of multiple BLs, the sub-groups corresponding to respective addresses, generating a sequence of addresses for reading the memory cells via multiple respective sub-groups, wherein the memory cells together store a data part and a pattern part that contains a predefined pattern;
detecting that the data part read from the memory cells is erroneous due to a fault that occurred in the sequence of addresses, by identifying a mismatch between the pattern part read from the memory cells and the predefined pattern; and
in response to detecting the fault, taking a corrective measure for recovering an error-free version of the data part.

10. The method according to claim 9, wherein generating the sequence of addresses comprises generating multiple addresses in parallel for accessing the memory cells via multiple respective sub-groups of BLs.

11. The method according to claim 9, wherein the fault causes skipping of at least one of the addresses in the sequences of addresses, and wherein detecting the fault comprises detecting the skipping.

12. The method according to claim 9, wherein recovering the error-free version of the data part comprises resetting in the storage circuitry a hardware element that is involved in generating the sequence of addresses.

13. The method according to claim 9, wherein at least the data part is protected using an Error Correction Code (ECC), wherein the fault causes reading the data part with false ordering, and wherein recovering the error-free version of the data part comprises reordering the data part for producing a reordered data part, and applying ECC decoding to the reordered data part.

14. The method according to claim 13, wherein the read data part comprises multiple data items that were accessed via multiple respective sub-groups of BLs, and wherein producing the reordered data part comprises identifying in the read data part a given data item that is suspected to be damaged by the fault, and replacing the given data item with another data item of the read data part.

15. The method according to claim 13, wherein detecting the fault comprises detecting the fault only after applying ECC decoding to the at least data part and identifying that the ECC decoding fails.

16. The method according to claim 9, wherein generating the sequence of addresses comprises generating the sequence of addresses for reading the memory cells in response to programming the data part and the pattern part to the memory cells.

* * * * *